United States Patent
Wu et al.

(10) Patent No.: US 11,228,073 B2
(45) Date of Patent: Jan. 18, 2022

(54) PROTECTION ASSEMBLY, COVER AND HOUSING

(71) Applicant: Contemporary Amperex Technology Co., Limited, Ningde (CN)

(72) Inventors: Kai Wu, Ningde (CN); Dan Shen, Ningde (CN); Xiaobo Chen, Ningde (CN); Shilong Chen, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 467 days.

(21) Appl. No.: 16/467,374

(22) PCT Filed: Dec. 4, 2018

(86) PCT No.: PCT/CN2018/119124
§ 371 (c)(1),
(2) Date: Jun. 6, 2019

(87) PCT Pub. No.: WO2020/042410
PCT Pub. Date: Mar. 5, 2020

(65) Prior Publication Data
US 2021/0359372 A1    Nov. 18, 2021

(30) Foreign Application Priority Data

Aug. 31, 2018  (CN) .......................... 201811013917.X

(51) Int. Cl.
*H01M 50/342* (2021.01)
*H01M 50/148* (2021.01)
(Continued)

(52) U.S. Cl.
CPC ..... *H01M 50/3425* (2021.01); *H01M 50/148* (2021.01); *H01M 50/383* (2021.01); *H01M 50/394* (2021.01); *H01M 2200/20* (2013.01)

(58) Field of Classification Search
CPC ........... H01M 50/3425; H01M 50/394; H01M 50/383; H01M 50/148; H01M 2200/20
See application file for complete search history.

(56) References Cited

U.S. PATENT DOCUMENTS

| | | | |
|---|---|---|---|
| 2009/0197153 A1 | 8/2009 | Fujikawa et al. | |
| 2011/0212348 A1* | 9/2011 | Yasui ................... | H01M 50/20 429/7 |

(Continued)

FOREIGN PATENT DOCUMENTS

| | | |
|---|---|---|
| CN | 1211344 A | 3/1999 |
| CN | 102356483 A | 2/2012 |

(Continued)

OTHER PUBLICATIONS

English translation of JP 2017-157508A obtained from Global Dossier (Year: 2017).*

(Continued)

*Primary Examiner* — Christopher P Domone
*Assistant Examiner* — Kimberly Wyluda
(74) *Attorney, Agent, or Firm* — Law Offices of Liaoteng Wang

(57) ABSTRACT

The disclosure relates to a protection assembly, a cover and a housing. The protection assembly is applied for an energy storage device having a pressure relief element, wherein the pressure relief element is structured to deform in response to an increasing internal pressure in the energy storage device until the pressure relief element bursts, and the energy storage device can expel high temperature particles through the burst pressure relief element. The protection assembly comprises: a particle-blocking layer comprising a receiving side for receiving the high temperature particles and a connecting side opposite to the receiving side, wherein the particle-blocking layer comprises a plurality of particle-blocking units in a concave-convex arrangement, and the (Continued)

particle-blocking unit can block the high temperature particles; and a separate protective layer disposed at the connecting side of the particle-blocking layer and connected to the particle-blocking layer.

20 Claims, 9 Drawing Sheets

(51) Int. Cl.
  *H01M 50/383* (2021.01)
  *H01M 50/30* (2021.01)

(56) References Cited

U.S. PATENT DOCUMENTS

| | | | |
|---|---|---|---|
| 2012/0028107 A1* | 2/2012 | Sugita | H01M 50/20 |
| | | | 429/156 |
| 2015/0079426 A1* | 3/2015 | Chen | H01M 50/20 |
| | | | 429/53 |
| 2018/0138478 A1 | 5/2018 | Chan | |

FOREIGN PATENT DOCUMENTS

| | | |
|---|---|---|
| CN | 103474599 A | 12/2013 |
| CN | 205069724 U | 3/2016 |
| CN | 206774590 U | 12/2017 |
| CN | 206907833 U | 1/2018 |
| CN | 206992203 U | 2/2018 |
| CN | 108075086 A | 5/2018 |
| EP | 0881697 A1 | 12/1998 |
| EP | 2555276 A1 | 2/2013 |
| EP | 3410512 A1 | 12/2018 |
| JP | 2010080352 A | 4/2010 |
| JP | 2013517591 A | 5/2013 |
| JP | 2014160573 A | 9/2014 |
| JP | 2014165026 A | 9/2014 |
| JP | 2017157508 A * | 9/2017 |
| WO | 2014053623 A2 | 4/2014 |
| WO | 2015031761 A1 | 3/2015 |
| WO | 2017130259 A1 | 8/2017 |

OTHER PUBLICATIONS

The extended European search report dated Nov. 8, 2019 for European Application No. 18884843.6 12 pages.
PCT International Search Report for PCT/CN2018/119124, dated May 23, 2019, 10 pages.
The First Office Action and search report dated Sep. 1, 2020 for Chinese Application No. 201811013917.X, 10 pages.
The Examination report dated Nov. 3, 2020 for European application No. 18884843.6, 7 pages.
Anonymous: "Understanding Sheet Distortion During Punching—Fabricating and Metalworking", Sep. 8, 2015, XP055744345, 3 pages.

* cited by examiner

PROTECTION ASSEMBLY, COVER AND HOUSING

CROSS REFERENCE

This application is a National Stage of International Application No. PCT/CN2018/119124 filed on Dec. 4, 2018, which claims priority to Chinese Patent Application No. 201811013917.X entitled "Protection Assembly, Cover and Housing" filed on Aug. 31, 2018, both of which are incorporated herein by reference in their entireties.

TECHNICAL FIELD

The present disclosure relates to the technical field of battery, and in particular to a protection assembly, a cover and a housing.

BACKGROUND

With continuous development of science and technology, requirements for a secondary battery with high energy density are also constantly improving. Enterprises put more and more attention to lightweight design of the secondary battery. It is a development tendency for a secondary battery to have an improved energy density in the same volume. A battery module comprises a plurality of secondary batteries. Multiple battery modules are encapsulated in a housing to form a battery pack. Currently, the secondary battery is generally provided with a pressure relief element (such as explosion-proof valve). The pressure relief element (such as explosion-proof valve, one-way valve, two way valve and the like) can also be provided on a cover of the battery module. When the secondary battery or battery module is impacted, overcharged or subject to a high temperature, the pressure relief element is forced open due to an increasing internal pressure. When a high gas pressure is applied to the pressure relief element, it is easy to cause the pressure relief element burst. Then, massive high temperature particles will be ejected from the pressure relief element. When the secondary batteries are assembled into the battery module, the high temperature particles can melt through the cover on the battery module which is disposed corresponding to the secondary batteries. When the battery modules form a battery pack, the high temperature particles can melt through a housing of the battery pack. As such, there are safety problems in the battery module or the battery pack.

SUMMARY

According to embodiments of the disclosure, a protection assembly, a cover and a housing are provided. The protection assembly can effectively intercept and block the high temperature particles, prevent the high temperature particles from melting through other structural members disposed corresponding to a pressure relief element, and effectively improve an operational safety of an energy storage device comprising the pressure relief element.

According to an aspect, the embodiments of the disclosure provide a protection assembly for an energy storage device having a pressure relief element, wherein the pressure relief element is structured to deform in response to an increasing internal pressure in the energy storage device until the pressure relief element bursts, and the energy storage device can expel high temperature particles through the burst pressure relief element. The protection assembly comprises: a particle-blocking layer comprising a receiving side for receiving the high temperature particles and a connecting side opposite to the receiving side, wherein the particle-blocking layer comprises a plurality of particle-blocking units in a concave-convex arrangement, and the particle-blocking unit can block the high temperature particles; and a separate protective layer disposed at the connecting side of the particle-blocking layer and connected to the particle-blocking layer.

The protection assembly according to embodiments of the disclosure comprises the particle-blocking layer and the separate protective layer which can effectively intercept the high temperature particles. When the protection assembly is disposed corresponding to the pressure relief element, the particle-blocking layer is closer to the pressure relief element than the separate protective layer. The massive high temperature particles ejected from the pressure relief element will be intercepted and blocked by the particle-blocking layer while meeting the particle-blocking layer, such that the high temperature particles cannot move anymore. Accordingly, the possibility that the high temperature particles directly contact with the cover or the housing such that the cover or the housing starts to melt is reduced, and the operational safety of the battery module or the battery pack is effectively ensured. Furthermore, the separate protective layer can further intercept and block the high temperature particles and prevent heat of the high temperature particles from being transferred to external structural members. As such, the protection assembly according to embodiments of the disclosure can effectively intercept and block the high temperature particles, prevent the high temperature particles from melting through other structural members disposed corresponding to the pressure relief element, and effectively improve the operational safety of the energy storage device.

According to another aspect, the embodiments of the disclosure provide a cover for a battery module, wherein the battery module comprises a case and a plurality of secondary batteries that comprise pressure relief elements and are disposed in the housing, the cover is configured to connect to the case in a sealed manner, and the cover comprises: a cover body and the above protection assembly, wherein the particle-blocking layer and the cover body are stacked.

According to another aspect, the embodiments of the disclosure provide a housing for a battery pack, wherein the battery pack comprises a plurality of battery modules, and the housing comprises: a first housing member; a second housing member connected to the first housing member in a sealed manner, wherein the first housing member and the second housing member form an accommodation space for receiving the battery modules; and the above protection assembly, wherein the protection assembly is disposed on a surface of the first housing member and/or the second housing member facing the battery modules.

BRIEF DESCRIPTION OF THE DRAWINGS

Features, advantages, and technical effects of exemplary embodiments of the present disclosure will be described below with reference to accompanying drawings.

Figure 1:
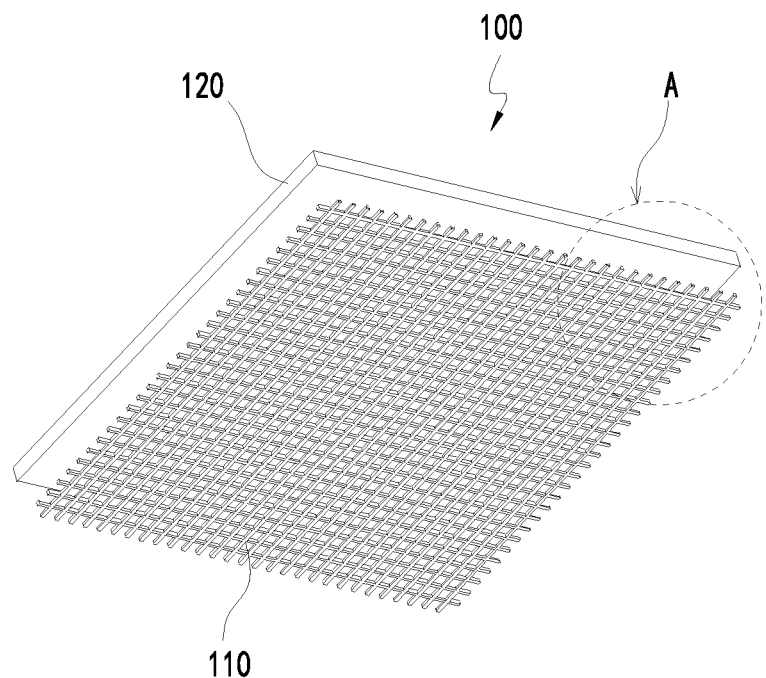
FIG. 1 is a schematic diagram of an overall structure of a protection assembly according to an implementation of a first embodiment of the disclosure.

The views are not necessarily plotted in actual proportion in the drawings.

REFERENCE SIGNS IN THE DRAWINGS

100 protection assembly;
110 particle-blocking layer;
111 hole;
112 grid;
113 body;
114 protrusion;
115 concave;
120 separate protective layer;
130 insulation layer;
90 battery module;
91 secondary battery;
92 pressure relief element;
93 cover;
930 cover body;
930a first surface;
930b second surface;
94 battery pack;
95 housing;
950 first housing member;
960 second housing member.

DETAILED DESCRIPTION

Below, embodiments of the present disclosure will be further described in detail with reference to the drawings and embodiments. The detailed description according to the embodiments and the accompanying drawings are intended to exemplary illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", and the like are configured for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding of the disclosure, a protection assembly 100 according to embodiments of the disclosure will be described below in detail with reference to FIGS. 1 to 14.

An energy storage device according to embodiments of the disclosure comprises a pressure relief element 92. The pressure relief element 92 is structured to deform in response to an increasing internal pressure in the energy storage device until the pressure relief element 92 bursts. When the internal pressure in the energy storage device reaches a predetermined pressure of the pressure relief element 92, the pressure relief element 92 will burst such that the internal pressure in the energy storage device is released to prevent hazardous conditions such as explosion of the energy storage device. When the pressure relief element 92 bursts, massive high temperature particles and gas are ejected from a broken region of the pressure relief element 92. The energy storage device can expel the high temperature particles and gas through the burst pressure relief element. The high temperature particle in the embodiment refers to a particle in which at least a part of its surface area is in a molten state or both its surface area and internal region are in a molten state, i.e., the temperature of at least a part of the particle is above its melting point.

In following embodiments of the disclosure, a protection assembly 100 according embodiments of the disclosure will be described in a case in which the energy storage device is a secondary battery 91 or a battery module 90. However, the type of the energy storage device is not limited in the disclosure. According to embodiments of the disclosure, the pressure relief element 92 is provided on the secondary battery 91. Optionally, the pressure relief element 92 is an explosion-proof valve. The battery module 90 according to the embodiments comprises a cover disposed corresponding to the pressure relief element 92 of the secondary battery 91. The battery pack according to the embodiment comprises a housing disposed corresponding to the cover, wherein the cover comprises a pressure relief element 92 or does not comprise a pressure relief element 92. Optionally, when the battery module 90 comprises a pressure relief element 92, the pressure relief element 92 can be an explosion-proof valve, one-way valve or two-way valve. The one-way valve or two-way valve in normal operation can allow gas to smoothly pass through and maintain pressure balance in the battery module. When there is an extremely high pressure in the battery module, the one-way valve or two-way valve will burst.

Figure 2:
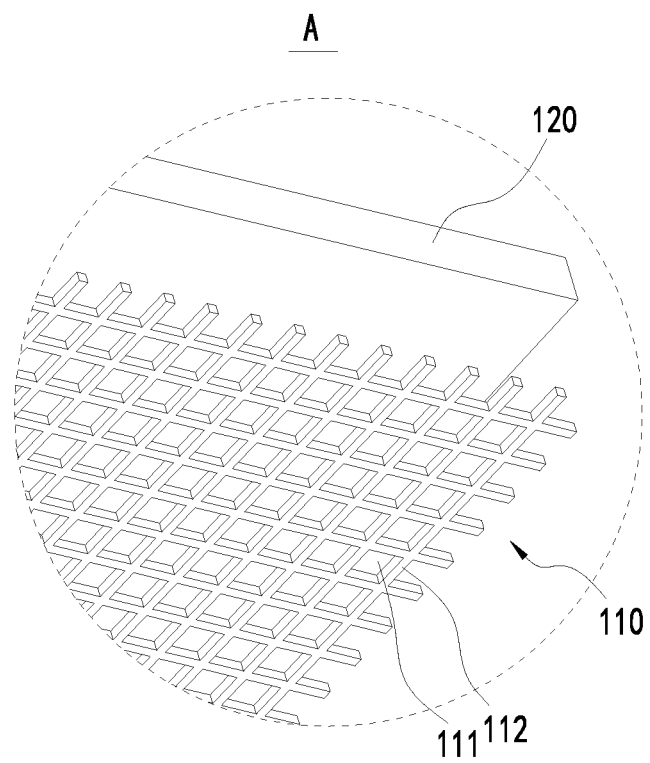
FIG. 2 is a partially enlarged view of a Portion A in FIG. 1.
Figure 3:
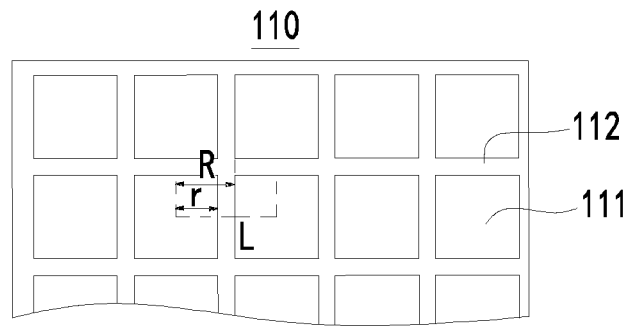
FIG. 3 is a schematic diagram of a partial structure of a particle-blocking layer according to an implementation of a first embodiment of the disclosure.
Figure 4:
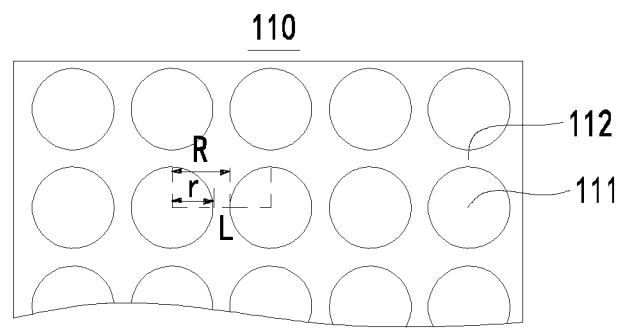
FIG. 4 is a schematic diagram of a partial structure of a particle-blocking layer according to another implementation of a first embodiment of the disclosure.
Figure 5:
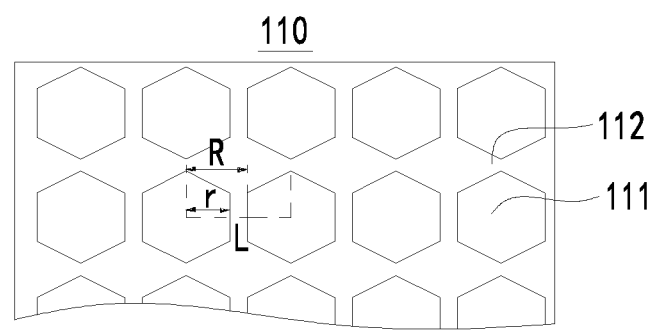
FIG. 5 is a schematic diagram of a partial structure of a particle-blocking layer according to another implementation of a first embodiment of the disclosure.
Figure 6:
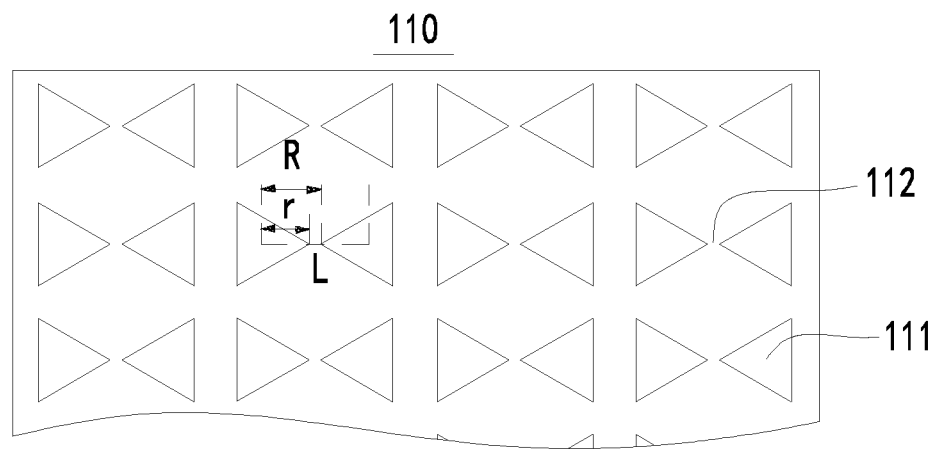
FIG. 6 is a schematic diagram of a partial structure of a particle-blocking layer according to another implementation of a first embodiment of the disclosure.

Referring to FIGS. 1 and 2, the protection assembly 100 according to embodiments of the disclosure comprises a particle-blocking layer 110 and a separate protective layer 120 connected to the particle-blocking layer 110. The particle-blocking layer 110 comprises a receiving side and a connecting side opposite to the receiving side. The particle-blocking layer 110 comprises a plurality of particle-blocking units in a concave-convex arrangement. The particle-blocking unit can block high temperature particles. The separate protective layer 120 is disposed at the connecting side of the particle-blocking layer 110 and connected to the particle-blocking layer 110. The particle-blocking layer 110 according to the embodiment has a predetermined thickness. In its thickness direction, the receiving side and the connecting side are disposed opposite to each other.

The particle-blocking layer 110 according to the embodiment comprises a plurality of particle-blocking units in a concave-convex arrangement. The concave-convex arrangement means a structure having both concaves and convexes. When the pressure relief element 92 bursts, the high temperature particles ejected from the pressure relief element 92 can move in a direction from the receiving side to the connecting side of the particle-blocking layer 110, i.e., the thickness direction of the particle-blocking layer 110. The particle-blocking unit can block the high temperature particles.

In an embodiment, the particle-blocking unit is configured to have a structure in which the high temperature particles can be accumulated on the particle-blocking units by accumulation. When the high temperature particles are accumulated on the particle-blocking units, the high temperature particles will be blocked by the particle-blocking units and thus cannot move any more.

The particle-blocking unit according to the embodiment blocks the high temperature particles in two ways. In one way, when the moving high temperature particles hit the particle-blocking unit, they will be bounced off in a reverse direction and then move away from the particle-blocking unit, thus they cannot pass through the particle-blocking unit but are blocked by the particle-blocking unit. In the other way, when the high temperature particles are accumulated on the particle-blocking unit by accumulation, the high temperature particles are intercepted by the particle-blocking unit and thus stop moving, thereby being blocked by the particle-blocking unit. The particle accumulation of the high temperature particles comprises the following process: a previously ejected portion of massive high temperature particles will directly contact with and adhere to the particle-blocking unit, and then a subsequently ejected portion of the high temperature particles will contact with and adhere to the high temperature particles that have been accumulated on the particle-blocking unit. In an exemplary embodiment, the surface area of the high temperature particle will be in a molten state, thus the high temperature particle can adhere to the particle-blocking unit or other high temperature particles.

The separate protective layer 120 according to the embodiment can block high temperature particles that have not been blocked by the particle-blocking layer 110 or that have not been accumulated on the particle-blocking layer 110, and thus forms a dual interception of the high temperature particles along with the particle-blocking layer 110. It improves interception probability and effect of the protection assembly 100. When the high temperature particles are accumulated on the particle-blocking layer 110, the particle-blocking layer 110 and the high temperature particles will release a lot of heat. The separate protective layer 120 according to the embodiment can also effectively prevent heat transfer to the cover or housing, prevent temperature rise in the cover or housing due to heat transfer to the cover or housing, reduce the possibility that the cover or housing melts after the temperature rise, and further improve the protection effect of the protection assembly 100. Furthermore, in some cases, when the pressure relief element 92 bursts, high temperature flame will be spouted. The separate protective layer 120 according to the embodiment can interdict the high temperature flame spouted out of the pressure relief element 92, and prevent the high temperature flame from burning the cover or the housing.

The protection assembly 100 according to the embodiment comprises the particle-blocking layer 110 and the separate protective layer 120 that can effectively intercept the high temperature particles. When the protection assembly 100 and the pressure relief element 92 are disposed at positions corresponding to each other, the particle-blocking layer 110 is closer to the pressure relief element 92 than the separate protective layer 120. The massive high temperature particles ejected from the pressure relief element 92 will first contact with the particle-blocking layer 110 and then be blocked by the particle-blocking layer 110 and/or accumulated on the particle-blocking layer 110, such that the high temperature particles will move in a direction away from the particle-blocking layer 110 or stop moving. Accordingly, the possibility that the high temperature particles directly contact with the cover or housing such that the cover or housing starts to melt is reduced, and the operational safety of the battery module 90 or the battery pack is effectively ensured. Furthermore, the separate protective layer 120 can further intercept and block the high temperature particles and prevent heat of the high temperature particles from being transferred to the cover or housing. Therefore, the protection assembly 100 according to embodiments of the disclosure can be applied into an energy storage device comprising a pressure relief element 92 to protect the energy storage device. The protection assembly 100 according to embodiments of the disclosure can effectively intercept and block the high temperature particles, prevent the high temperature particles from melting through the cover, the housing or other structural members disposed corresponding to the pressure relief element 92, and effectively improve the operational safety of the energy storage device comprising the pressure relief element 92.

Technical solutions of a protection assembly 100 according to embodiments of the disclosure will be described in detail below with reference to the embodiments. However, the embodiments described herein are not intended to limit the protection scope of the disclosure.

First Embodiment

As shown in FIGS. 1-6, a protection assembly 100 according to the embodiment comprises a particle-blocking layer 110 that has a mesh structural member with a predetermined thickness. Each particle-blocking unit comprises holes 111 extending in a thickness direction of the particle-blocking layer 110 and grids 112 enclosing the holes 111. The hole 111 forms a concave of the particle-blocking unit and the grid 112 forms a convex of the particle-blocking unit, such that the particle-blocking units form a structure having a concave-convex arrangement. The wall of the holes 111 and/or the grids 112 can block or accumulate the high temperature particles such that the intercepting of the high temperature particles can be achieved.

In an embodiment, the grid 112 can be a connecting portion between two adjacent holes 111. The wall of the hole 111 and the grid 112 can intercept the high temperature particles. Specifically, when the high temperature particles ejected from the pressure relief element 92 hit the hole wall or the grid 112, a portion of the high temperature particles change the original moving direction and moving speed due to the hitting, such that the high temperature particles are blocked by the particle-blocking layer 110. A previously ejected portion of the high temperature particles will be intercepted by the hole wall and/or the grid 112 and then accumulated on the hole wall and/or the grid 112; and a subsequently ejected portion of the high temperature particles will be continuously accumulated on the previously intercepted high temperature particles such the particle accumulation is formed. In an example, a bulge is formed after many high temperature particles are accumulated. Multiple bulges can be formed at the hole wall or the grid 112.

In an embodiment, the mesh structural member can be formed by directly making holes 111 in a sheet blank, through for example punching or drilling, such that the particle-blocking layer 110 can be conveniently manufactured. Alternatively, the mesh structural member can be formed by weaving. For example, warp and weft threads are woven to form rectangular holes 111. Two adjacent warp threads and two adjacent weft threads are spaced apart such that a hole 111 can be formed by the two adjacent warp threads and two adjacent weft threads.

Referring to FIGS. 3 to 6, to ensure the particle-blocking units in the particle-blocking layer 110 can effectively block the high temperature particles, two adjacent holes 111 in the particle-blocking layer 110 according to embodiments of the disclosure satisfy a relation (1), $$0.005 \leq r/(R-r) \leq 5 \quad (1)$$

wherein a straight connecting line between central points of the two adjacent holes 111 is denoted as L, and in the relation (1), r refers to a radius from a central point of one of the two adjacent holes 111 to its own hole wall along the straight connecting line, and R refers to a dimension from a central point of one of the two adjacent holes 111 to a hole wall of the other hole along the straight connecting line.

When the pressure relief element 92 bursts, the high temperature flame is spouted while the high temperature particles are ejected from the pressure relief element 92. Since the high temperature particles or high temperature flame applies a large impact force, the protection assembly 100 shall be able to withstand the impact force without breaking.

When $r/(R-r)>5$, if r is a constant value, R shall satisfy $R<6r/5$; or if R is a constant value, r shall satisfy $r>5R/6$. In the above two cases, a grid 112 between two adjacent holes 111 will have a small width, thus the grid 112 between the two adjacent holes 111 will have a weak zone. The weak zone of the grid 112 has a small rigidity and a reduced impact resistance, thus the weak zone is liable to break under the impact of the high temperature particles. When a portion of the grid 112 in the mesh structural member breaks, the two adjacent holes 111 will communicate with each other, which results into a large gap in this area. The high temperature particles can easily pass through the gap and will not be readily blocked by the particle-blocking layer 110 or accumulated on the particle-blocking layer 110, such that this area fails to intercept or block the high temperature particles.

When $0.005>r/(R-r)$, if r is a constant value, R shall satisfy $R>201r$; or if R is a constant value, r shall satisfy $r<R/201$. In the above two cases, a grid 112 between two adjacent holes 111 will have a large width, thus the grid 112 will have an improved overall rigidity but a reduced plasticity. Accordingly, the grid 112 will have a reduced deformability, and is liable to break under instant impact force. Then, the high temperature particles or high temperature flame with large impact force may directly break the grid 112. When a portion of the grid 112 in the mesh structural member breaks, the two adjacent holes 111 will communicate with each other, which results into a large gap in this area. The high temperature particles can easily pass through the gap and will not be readily blocked by the particle-blocking layer 110 or accumulated on the particle-blocking layer 110, such that this area fails to block the high temperature particles.

In embodiments of the disclosure, when $0.005 \leq r/(R-r) \leq 5$, the grid 112 between two adjacent holes 111 will have an appropriate width with respect to the dimension of the hole 111. Therefore, the grid 112 will have a relative balance between the rigidity and the plasticity, i.e., having both good impact resistance and good deformability. Accordingly, when the high temperature particles or high temperature flame with large impact force directly impact on the grid 112, the grid 112 can dampen the impact force by its deformation, thus the possibility that the grid 112 breaks is reduced. When the high temperature particles or high temperature flame with small impact force directly impact on the grid 112, since the grid 112 has a good impact resistance, it can withstand the impact force without dampening the impact force by its deformation. As such, the particle-blocking layer 110 can effectively intercept and block the high temperature particles while its structural integrity is ensured.

In an embodiment, r is ranged from 0.01 mm to 2.5 mm. When the hole 111 has a small radius, the high temperature particles ejected from the pressure relief element 92 within a short time may quickly obstruct the hole 111. On one side, the subsequently ejected high temperature particles cannot accumulate on the wall of the hole 111, which significantly reduce the interception effect of the wall of the hole 111. On the other side, when the hole 111 is obstructed by the high temperature particles, the radius of the hole 111 will be reduced. Then, the high temperature particles or high temperature flame with large impact force will apply an impact force on the high temperature particles accumulated in the hole 111, which will superimpose on the impact force applied on the grid 112. Accordingly, the actual impact force on the grid 112 will be increased, thus the grid 112 is more liable to break under the impact of the high temperature particles or high temperature flame with large impact force. When a portion of the grid 112 in the mesh structural member breaks, the two adjacent holes 111 will communicate with each other, which results into a large gap in this area. The high temperature particles can easily pass through the gap and will not be readily blocked by the particle-blocking layer 110 or accumulated on the particle-blocking layer 110, such that this area fails to intercept or block the high temperature particles. When the hole 111 has a large radius, the high temperature particles can easily pass through the gap and will not be accumulated on the wall of the hole 111, which significantly reduces the interception effect of the wall of the hole 111 such that the wall of the hole 111 cannot effectively intercept or block the high temperature particles.

In an embodiment, the hole 111 has a cross section of circle, rectangle, regular triangle, regular hexagon and the like.

The particle-blocking layer 110 according to embodiments of the disclosure has a temperature tolerance of 500° C. to 3000° C. Accordingly, the particle-blocking layer 110 has a good high temperature resistance, and thus has a strength retention and a high elasticity modulus in high temperature environment. Therefore, the particle-blocking layer 110 is not easy to deform and has a stable dimension in high temperature environment such that it can withstand high temperature of the high temperature particles and the high temperature flame ejected from the pressure relief element 92 without melting. As such, the particle-blocking layer 110 can effectively intercept and block the high temperature particles in high temperature environment while its structural integrity is ensured.

The particle-blocking layer 110 according to embodiments of the disclosure can be a single material or a composite material made from two or more different materials. For a particle-blocking layer 110, its temperature tolerance is inversely proportional to its tolerance time. In an embodiment, the particle-blocking layer 110 has a temperature tolerance of 500° C. to 2000° C., and accordingly the tolerance time for melting of the particle-blocking layer 110 is from 2 s to 3600 s. As such, the particle-blocking layer 110 will effectively ensure a good plasticity and a good strength in high temperature environment, and will not be deformed or melted within a predetermined time. It can effectively improve an overall tolerance and impact resistance of the protection assembly 100.

The particle-blocking layer 110 according to embodiments of the disclosure has a thickness of 0.2 mm to 3 mm. In an embodiment, the particle-blocking layer 110 has an areal density (mass per unit area) of 0.2 kg/m² to 18.6 kg/m². The separate protective layer 120 has a thickness of 0.5 mm to 10 mm. If the thickness of the separate protective layer 120 is less than 0.5 mm, for a short time in which the pressure relief element 92 bursts, the separate protective layer 120 cannot withstand an instant high temperature and will be melted and damaged, thereby losing its insulating effect. If the thickness of the separate protective layer 120 is larger than 10 mm, the separate protective layer 120 will affect the overall assembling and quality of the protection assembly 100. When the protection assembly 100 is applied into a battery module 90 or battery pack, the protection assembly 100 will reduce the energy density of the battery module 90 or battery pack. In an embodiment, the separate protective layer 120 has a thermal conductivity no more than 0.04 W·m⁻¹·K⁻¹. As such, the separate protective layer 120 can provide a better insulating effect. In high temperature, the separate protective layer 120 can have a temperature difference of 100° C. to 150° C. or even larger temperature difference between two opposing surfaces in its thickness direction, thus the heat transfer can be significantly retarded or even avoided.

The material of the particle-blocking layer 110 according to embodiments of the disclosure can be high melting point metal material such as iron and its alloys, copper and its alloys, nickel alloys and the like; or can be composite material with good strength and stable dimension at high temperature such as carbon fiber, aramid and the like. The material of the separate protective layer 120 can be nitrogen-containing polymer, aerogel composite material, fireproof fabrics or fireproof coatings resistant to high temperature, wherein the nitrogen-containing polymer can be melamine foam, polyurethane foam, polyimide foam, while the fireproof fabrics can be fireproof cloth, fiberglass cloth, aramid fabric, ceramic fiber fabric and the like.

The material of the separate protective layer 120 is preferably nitrogen-containing polymer, such as one or more of melamine polymer, polyamide (PA, commonly known as nylon), polyparaphenylene terephthalamide (PPTA, commonly known as aramid) and polyimide (PI). When the nitrogen-containing polymer is decomposed at a high temperature, non-combustible gas such as nitrogen, nitrogen oxides, water vapor and the like can be easily generated. The heat absorption by the decomposition of the nitrogen-containing polymer and the generation of the non-combustible gas will consume a lot of heat, which can greatly reduce the surface temperature of the separate protective layer 120. The above non-combustible gas can decrease the concentrations of oxygen in the battery module 90 and combustible gas generated when polymers are thermally decomposed, and can react with the oxygen and the combustible gas such that the oxygen and the combustible gas will be converted into noncombustible gas, such as nitrogen, nitrogen oxide, water vapor and the like. According to chain reaction theory of combustion, when comburent and combustible for maintain the combustion are separated from each other and consumed, flame density in the combustion region will be reduced. Finally, the combustion reaction rate decreases and the combustion terminates, thus good flame retardation and heat insulation is achieved. The nitrogen-containing polymer is preferably melamine polymer, such as melamine formaldehyde resin and its derivatives. When the melamine polymer is thermally decomposed, it can produce more noncombustible gas, such as nitrogen, nitrogen oxide, water vapor and the like, and can form a vitreous or stable foam covering layer at a high temperature (generally 400° C.-600° C.), which can prevent oxygen and combustible gas from escaping outward.

In an embodiment, the particle-blocking layer 110 and the separate protective layer 120 are stacked. The particle-blocking layer 110 and the separate protective layer 120 are pressed against each other. There is no gap or only small gap between the particle-blocking layer 110 and the separate protective layer 120. When the high temperature particles impacts on the particle-blocking layer 110, since the particle-blocking layer 110 is restricted by the separate protective layer 120, the particle-blocking layer 110 will not deform towards the separate protective layer 120 under the impact force of the high temperature particles such that the particle-blocking layer 110 will not break due to its deformation. Furthermore, since there is no gap or only small gap between the particle-blocking layer 110 and the separate protective layer 120, the high temperature particles will not pass through the particle-blocking layer 110 to accumulate between the particle-blocking layer 110 and the separate protective layer 120 and thereby melt through the separate protective layer 120 due to overheating of the separate protective layer 120. In an embodiment, the particle-blocking layer 110 and the separate protective layer 120 can be fixedly connected by bonding or other fasteners.

Figure 7:
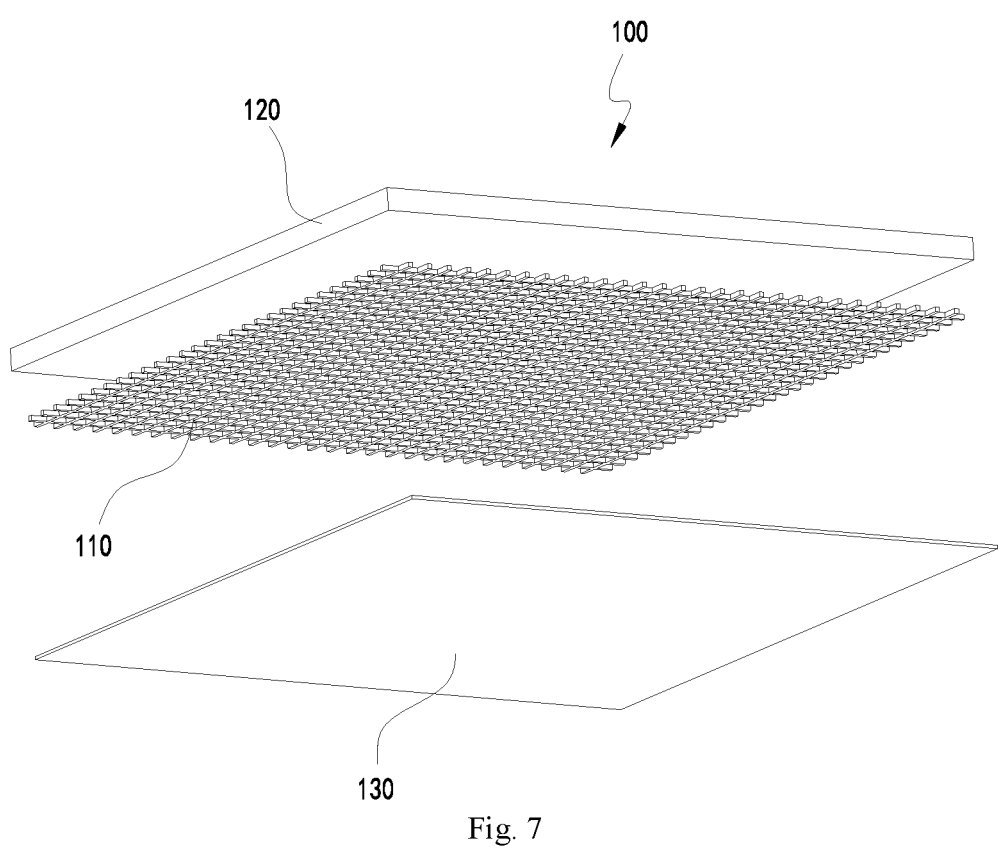
FIG. 7 is a schematic diagram of an overall structure of a protection assembly according to another implementation of a first embodiment of the disclosure.

Referring to FIG. 7, the protection assembly 100 according to embodiments of the disclosure further comprises an insulation layer 130 connected to the particle-blocking layer 110. The insulation layer 130 and the separate protective layer 120 are disposed at two respective sides of the particle-blocking layer 110 such that the particle-blocking layer 110 is arranged between the insulation layer 130 and the separate protective layer 120. The insulation layer 130 covers the particle-blocking units of the particle-blocking layer 110. The insulation layer 130 can insulate the particle-blocking layer 110 from external structural members. In an embodiment, the insulation layer 130 can be made of plastic, rubber and the like. When the pressure relief element 92 bursts, the high temperature particles or high temperature flame will first melt the insulation layer 130, and then subsequent high temperature particles will accumulate on the particle-blocking layer 110. The insulation layer 130 according to embodiments of the disclosure can be made of insulating materials with high temperature resistance and inherent fire resistance, such as silicone mica, silicone rubber, aramid and the like. On one side, when the high temperature particles impact on and contact with the insulation layer 130, the insulation layer 130 will not be easily melt through by the high temperature particles under the impact of high temperature. It can effectively improve the resistance ability of the protection assembly and extend the resistance time. On the other side, the insulation layer 130 will not burn under the impact of high temperature. Accordingly, there is no flame propagation in the insulation layer 130 or there is no spark dropping from the insulation layer 130 to the below energy storage device which will cause failure of the energy storage device.

The technical solution of the disclosure will be further described below with reference to specific examples. The following examples are described in a case in which the protection assembly 100 is applied into the battery module 90 or the battery pack. However, the protection scope of the disclosure is not limited to the following examples.

Example 1

The particle-blocking unit of the particle-blocking layer 110 according to embodiments of the disclosure is a mesh structural member. The hole 111 of the particle-blocking unit has a hole radius r of 0.038 mm to 4.75 mm. The hole 111 is made of iron wire mesh. The separate protective layer 120 has a thickness of 0.5 mm to 10 mm, and is made of melamine foam. The protection assembly 100 according to the example of the disclosure comprises the above particle-blocking layer 110 and separate protective layer 120. After the protection assembly 100 according to the example of the disclosure is tested, when the pressure relief element 92 bursts, the cover of the battery module 90 or the housing of the battery pack will not be melt through.

Examples 2 to 13

Some parameters of Examples 2-13 are different from that of Example 1, but they can achieve same technical effect. After the respective protection assembly 100 according to the examples of the disclosure is tested, when the pressure relief element 92 bursts, the cover of the battery module 90 or the housing of the battery pack will not be melt through. Specific conditions are shown in Table 1.

TABLE 1

| | Radius r | Material of particle-blocking layer | Thickness of separate protective layer | Material of separate protective layer |
|---|---|---|---|---|
| Example 1 | 0.038 mm to 4.75 mm | Iron wire mesh | 0.5 mm to 10 mm | Melamine foam |
| Example 2 | 0.038 mm to 4.75 mm | Copper wire mesh | 0.5 mm to 10 mm | Melamine foam |
| Example 3 | 0.038 mm to 4.75 mm | Aluminium alloy | 0.5 mm to 10 mm | Melamine foam |
| Example 4 | 0.038 mm to 4.75 mm | Silicon-containing fabric | 0.5 mm to 10 mm | Melamine foam |
| Example 5 | 0.038 mm to 4.75 mm | Iron wire mesh | 0.5 mm to 10 mm | Polycyanamide foam |
| Example 6 | 0.038 mm to 4.75 mm | Copper wire mesh | 0.5 mm to 10 mm | Polycyanamide foam |
| Example 7 | 0.038 mm to 4.75 mm | Aluminium alloy | 0.5 mm to 10 mm | Polycyanamide foam |
| Example 8 | 0.038 mm to 4.75 mm | Silicon-containing fabric | 0.5 mm to 10 mm | Polycyanamide foam |
| Example 9 | 0.850 mm | Iron wire mesh | 5 mm | Melamine foam |
| Example 10 | 0.850 mm | Iron wire mesh | 5 mm | Silicone foam |
| Example 11 | 0.850 mm | Iron wire mesh | 5 mm | Polyurethane foam |
| Example 12 | 0.850 mm | Iron wire mesh | 5 mm | Phenolic resin foam |
| Example 13 | 0.850 mm | Iron wire mesh | 5 mm | Unsaturated resin foam |

Furthermore, a protection test of the protection assembly 100 according to embodiments of the disclosure comprises the following process.

The battery module 90 or the battery pack is fully charged. The pressure relief element 92 of the secondary battery 91 directly faces the cover of the battery module 90, and the pressure relief element 92 of the battery module 90 directly faces the housing of the battery pack, or the pressure relief element 92 of the secondary battery 91 of the battery module directly faces the housing of the battery pack. Then, heating, nail penetration or overcharging is used to initiate the runaway of the secondary battery 91. The temperatures of the pressure relief element 92 and the cover are monitored or the temperatures of the pressure relief element 92 and the housing are monitored, while the structural change of the cover or the housing is observed and recorded.

Comparative Example 1: only the particle-blocking layer 110 is provided, the radius r of the particle-blocking layer 110 is 0.85 mm, the particle-blocking layer 110 is made of iron wire mesh, and there is no separate protective layer 120.

Comparative Example 2: only the separate protective layer 120 is provided, the thickness of the separate protective layer 120 is 10 mm, the separate protective layer 120 is made of melamine foam, and there is no particle-blocking layer 110.

The test results of Examples 1 to 13 and Comparative Examples 1-2 were specifically shown in Table 2 below.

TABLE 2

| | Temperature of explosion-proof valve | Temperature of cover or housing | Structural change of cover or housing |
|---|---|---|---|
| Examples 1 to 13 | 800° C. to 1300° C. | Less than 600° C. | No melting through, no damage |
| Comparative Example 1 | 800° C. to 1300° C. | 700° C. to 900° C. | Thermal melting or burning |
| Comparative Example 2 | 800° C. to 1300° C. | 800° C. to 1300° C. | Quickly melting through |

Second Embodiment

In the first embodiment, the structure of the protection assembly 100 is described. In this embodiment, the difference from the first embodiment will be mainly described, and identical structure and identical technical effect will not be repeated in this embodiment.

Referring to FIGS. 8 to 14, the particle-blocking layer 110 according to embodiments of the disclosure comprises a sheet body 113 and a plurality of protrusions 114 protruding from a surface of the body 113 in its thickness direction and spaced apart from each other. Each particle-blocking unit comprises two adjacent protrusions 114 and a concave 115 between the two adjacent protrusions 114. The concave 115 is a concave of the particle-blocking unit and the protrusion 114 is a convex of the particle-blocking unit, such that the particle-blocking unit configured as a structural member a in a concave-convex arrangement. The separate protective layer 120 is disposed on a side of the body 113 away from the protrusions 114.

The high temperature particles ejected from the pressure relief element 92 substantially move in straight lines. On one side, when the high temperature particles meet the particle-blocking unit, they will hit the protrusion or the concave and then be bounced off, thereby changing the original moving direction and moving speed. On the other side, when the high temperature particles meet the protrusion 114 of the particle-blocking unit, a portion of the high temperature particles will directly attach to the outer surface of the protrusion 114, while another portion of the high temperature particles will be blocked by the protrusion 114 to change the original moving direction and moving speed such that these high temperature particles will get into the concave 115 between two protrusions 114 and attach to the concave 115. Furthermore, subsequent high temperature particles will accumulate on the intercepted high temperature particles and form a bulge. As such, the particle-blocking layer 110 according to embodiments of the disclosure can effectively intercept the high temperature particles through the particle-blocking units.

Figure 11:
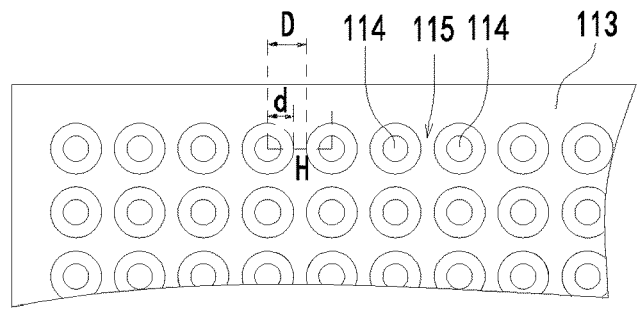
FIG. 11 is a top view of a partial structure of a particle-blocking layer of a protection assembly as shown in FIG. 8.
Figure 12:
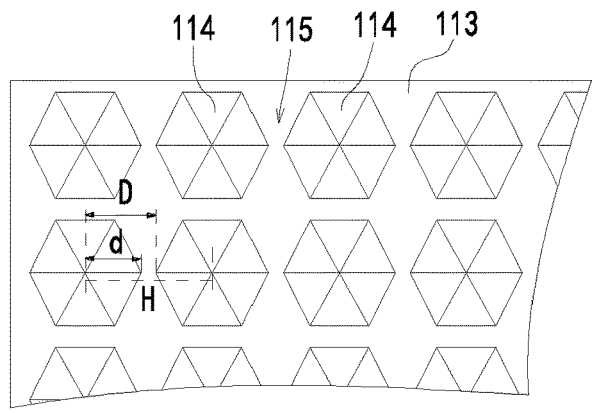
FIG. 12 is a top view of a partial structure of a particle-blocking layer according to an embodiment in a protection assembly according to a second embodiment of the disclosure.

As shown in FIGS. 11 and 12, to ensure the particle-blocking unit in the particle-blocking layer 110 can effectively intercept and block the high temperature particles, two adjacent protrusions 114 in the particle-blocking layer 110 according to embodiments of the disclosure satisfy a relation (2), $$0.005 \leq d/(D-d) \leq 5 \qquad (2)$$

wherein the two adjacent protrusions 114 each has a projection on the surface of the body 113, and a straight connecting line between respective central points of the two adjacent protrusions 114 in the projections is denoted as H, and wherein in the relation (2), d refers to a dimension from a central point of one of the two adjacent protrusions 114 in the projection to its own edge in the projection along the straight connecting line, D refers to a dimension from a central point of one of the two adjacent protrusions 114 in the projection to an edge of the other protrusion 114 in the projection along the straight connecting line.

When the pressure relief element 92 bursts, the high temperature flame is spouted while the high temperature particles are ejected from the pressure relief element 92, thus the high temperature particles or the high temperature flame will be blocked by the protrusion 114.

When $d/(D-d)>5$, if d is a constant value, D shall satisfy $D<6d/5$; or if D is a constant value, d shall satisfy $d>5D/6$. In the above two cases, the distance between two adjacent protrusions 114 is small, thus the passing ability of the high temperature particles or the passing ability of gas between the adjacent two protrusions 114 is reduced. As such, the high temperature particles may obstruct the gap between the two adjacent protrusions 114 such that the protrusions 114 cannot effectively have a lot of high temperature particles accumulated thereon or cannot effectively achieve dispersion of gas flow. Accordingly, the high temperature particles cannot beneficially accumulate on the particle-blocking layer 110, and thus the intercepting effect of the high temperature particles by the particle-blocking layer 110 is reduced.

When $0.005>d/(D-d)$, if d is a constant value, D shall satisfy $D>201d$; or if D is a constant value, d shall satisfy $d<D/201$. In the above two cases, the distance between two adjacent protrusions 114 is large, a lot of the high temperature particles or the high temperature flame will directly impact on the concave 115 between the two adjacent protrusions 114 and thus apply a large impact force on the concave 115. Since a portion of the particle-blocking layer 110 corresponding to the concave 115 has a smaller thickness than that of a portion of the particle-blocking layer 110 corresponding to the protrusion 114, the portion of the particle-blocking layer 110 corresponding to the concave 115 is liable to break or be damaged under direct impact of massive high temperature particles or high temperature flame. Accordingly, the high temperature particles can pass through the broken region and will not be intercepted or blocked by the particle-blocking layer 110, and thereby the particle-blocking layer 110 cannot effectively intercept or block the high temperature particles.

In embodiments of the disclosure, when $0.005 \leq d/(D-d) \leq 5$, two adjacent protrusions 114 will have an appropriate distance therebetween. Therefore, it is well balanced between the passing ability of the high temperature particles or the passing ability of gas between the two adjacent protrusions 114 and the strength of the particle-blocking layer 110 corresponding to the concave 115, i.e., there are both good impact resistance and good effect in accumulation and flow diversion. As such, while the particle-blocking layer 110 can withstand direct impact force from the high temperature particles, a portion of the high temperature particles ejected from the pressure relief element 92 can directly accumulate on the protrusions 114, and another portion of the high temperature particles will be obstructed by the protrusions 114 to change the moving direction and moving speed and then accumulate on the concaves 115. Therefore, the impact force on the portion of the particle-blocking layer 110 corresponding to the concaves 115 is reduced. Furthermore, the high temperature flame spouted from the pressure relief element 92 will be obstructed by the protrusions 114 to change the moving direction and moving speed such that the energy of the high temperature flame is dispersed and the impact force on the particle-blocking layer 110 is reduced. As such, the particle-blocking layer 110 can effectively intercept and block the high temperature particles while its structural integrity is ensured.

In an embodiment, d is ranged from 0.01 mm to 2.5 mm. When the protrusion 114 has a dimension smaller than 0.01 mm, the protrusion 114 will have a narrow structure and a low strength, and the high temperature particles ejected from the pressure relief element 92 within a short time may directly impact on the protrusions 114 and thus distort or bend the protrusions 114. Accordingly, the protrusions 114 will fail to obstruct the high temperature particles or disperse the gas flow. When the protrusion 114 has a dimension larger than 2.5 mm, the amount of the protrusions 114 that can be arranged per unit area will be reduced, and the intercepting effect of the high temperature particles by the protrusions 114 will be reduced.

Figure 8:
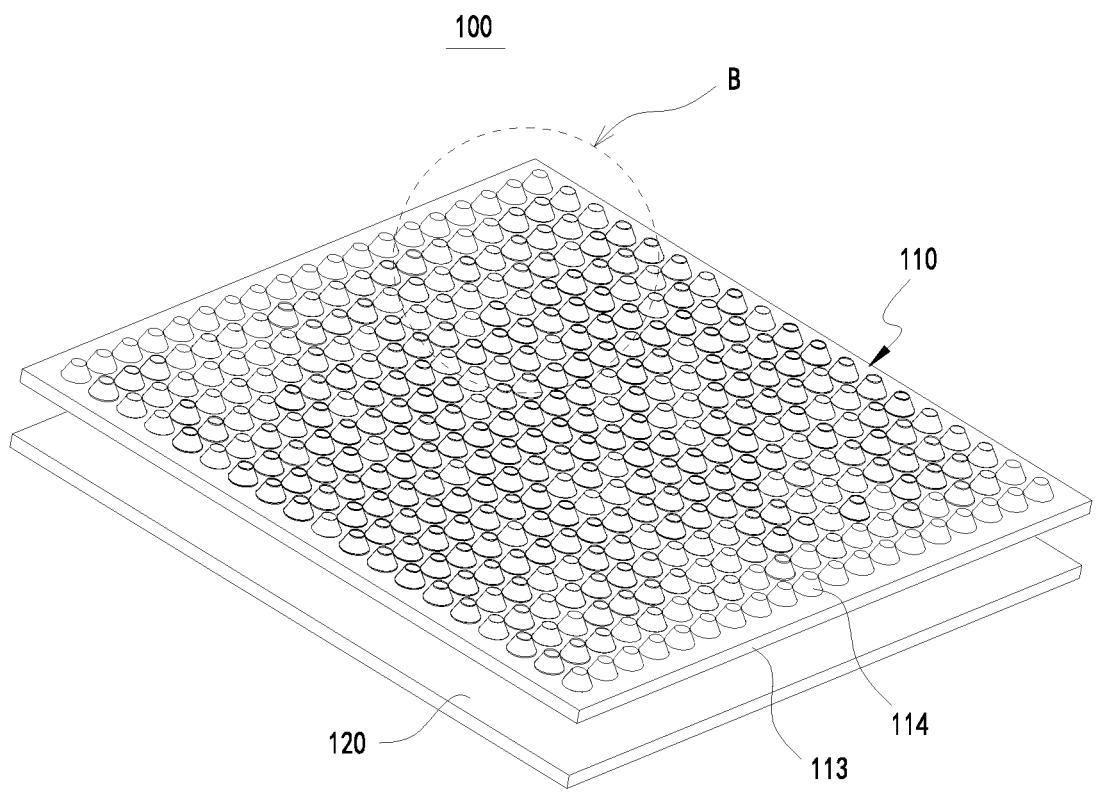
FIG. 8 is a schematic diagram of an overall structure of a protection assembly according to an implementation of a second embodiment of the disclosure.
Figure 9:
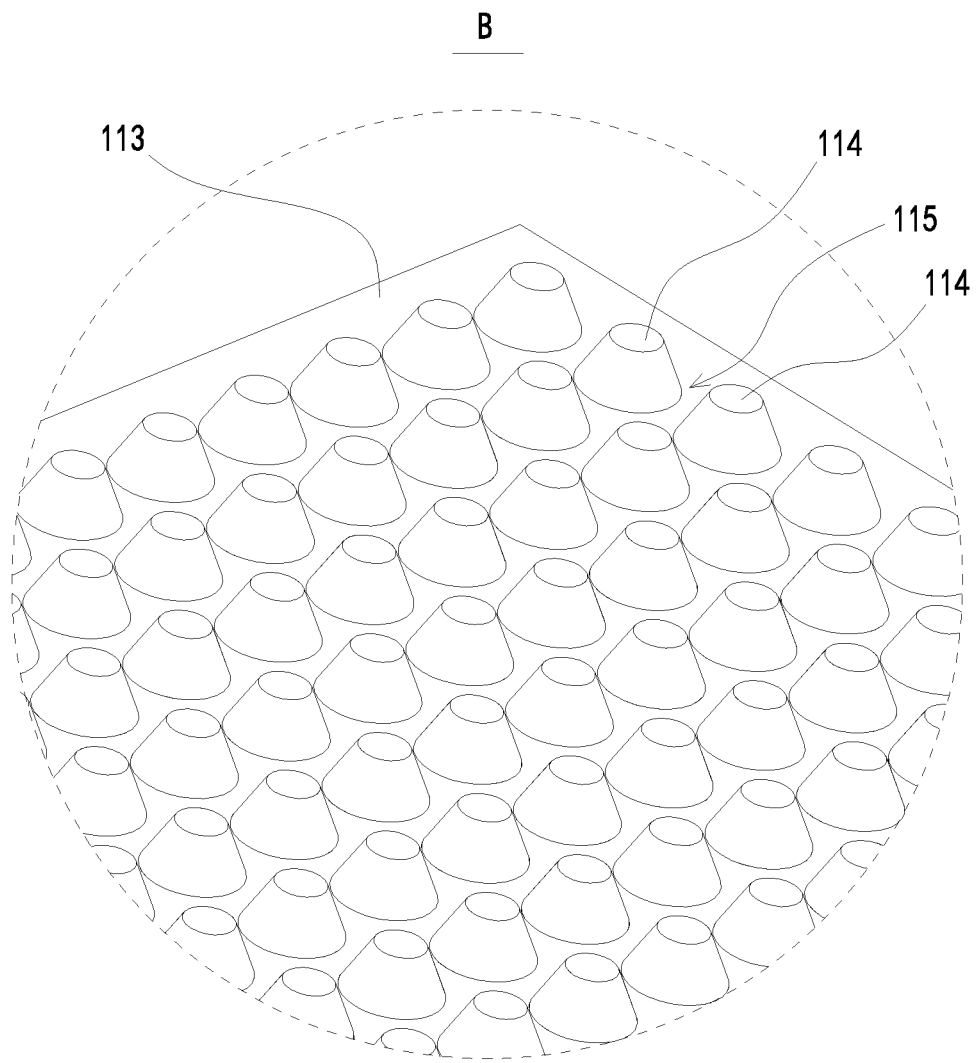
FIG. 9 is a partially enlarged view of a Portion B in FIG. 8.
Figure 10:
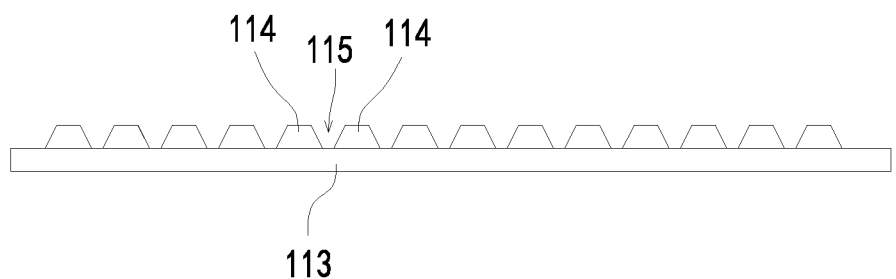
FIG. 10 is a side view of a structure of a particle-blocking layer of a protection assembly as shown in FIG. 8.
Figure 13:
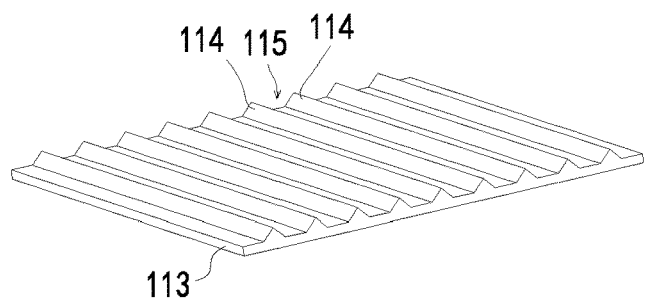
FIG. 13 is a schematic diagram of an overall structure of a protection assembly according to another implementation of a second embodiment of the disclosure.
Figure 14:
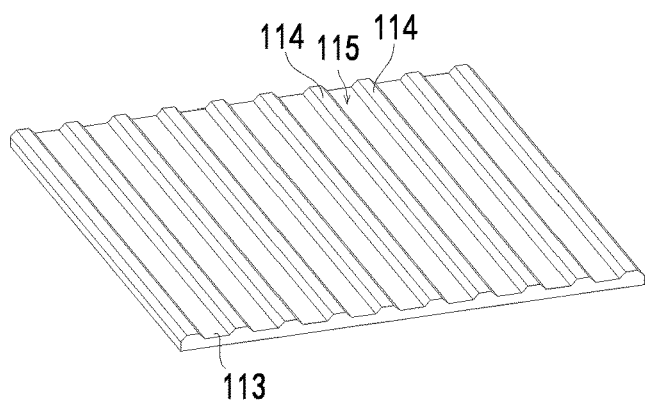
FIG. 14 is a schematic diagram of an overall structure of a protection assembly according to another implementation of a second embodiment of the disclosure.

In an embodiment, the protrusion 114 can have a shape of regular triangle, rectangle, regular pentagon, regular hexagon, circle and the like in its projection. A center of each protrusion 114 in its projection is a centre-of-gravity on the projection. For example, when the projection has a shape of regular triangle, rectangle, regular pentagon, circle, regular hexagon and the like, the center of projection is a geometric center in the corresponding shape. Optionally, the protrusion 114 has an overall structure of truncated cone, pyramid, truncated pyramid, long narrow shape, corrugated shape and the like. For example, the protrusion 114 as shown in FIG. 8 has a structure of truncated cone. The protrusion 114 as shown in FIG. 12 has a shape of hexagonal frustum. The protrusion 114 as shown in FIG. 13 has a structure of long narrow shape which has a triangular cross section. The protrusion 114 as shown in FIG. 14 has a structure of long narrow shape which has a trapezoidal cross section.

The protection assembly 100 according to embodiments of the disclosure can intercept and block the high temperature particles through its particle-blocking units such that the high temperature particles will not contact with and thus burn other structural members. As such, the protection assembly 100 according to embodiments of the disclosure can protect the other structural members. Furthermore, the separate protective layer 120 of the protection assembly 100 can effectively prevent heat transfer and thus prevent heat of the high temperature particles from being transferred to other structural members, thereby further improving the protective capability of the protection assembly 100. When the protection assembly 100 according to embodiments of the disclosure is applied into the battery module 90 or the battery pack, the protection assembly 100 can effectively intercept the high temperature particles ejected from the pressure relief element 92 of the secondary battery 91 or the pressure relief element 92 of the battery module 90, thus the possibility that the cover of the battery module 90 or the housing of the battery pack starts to melt is reduced.

Figure 15:
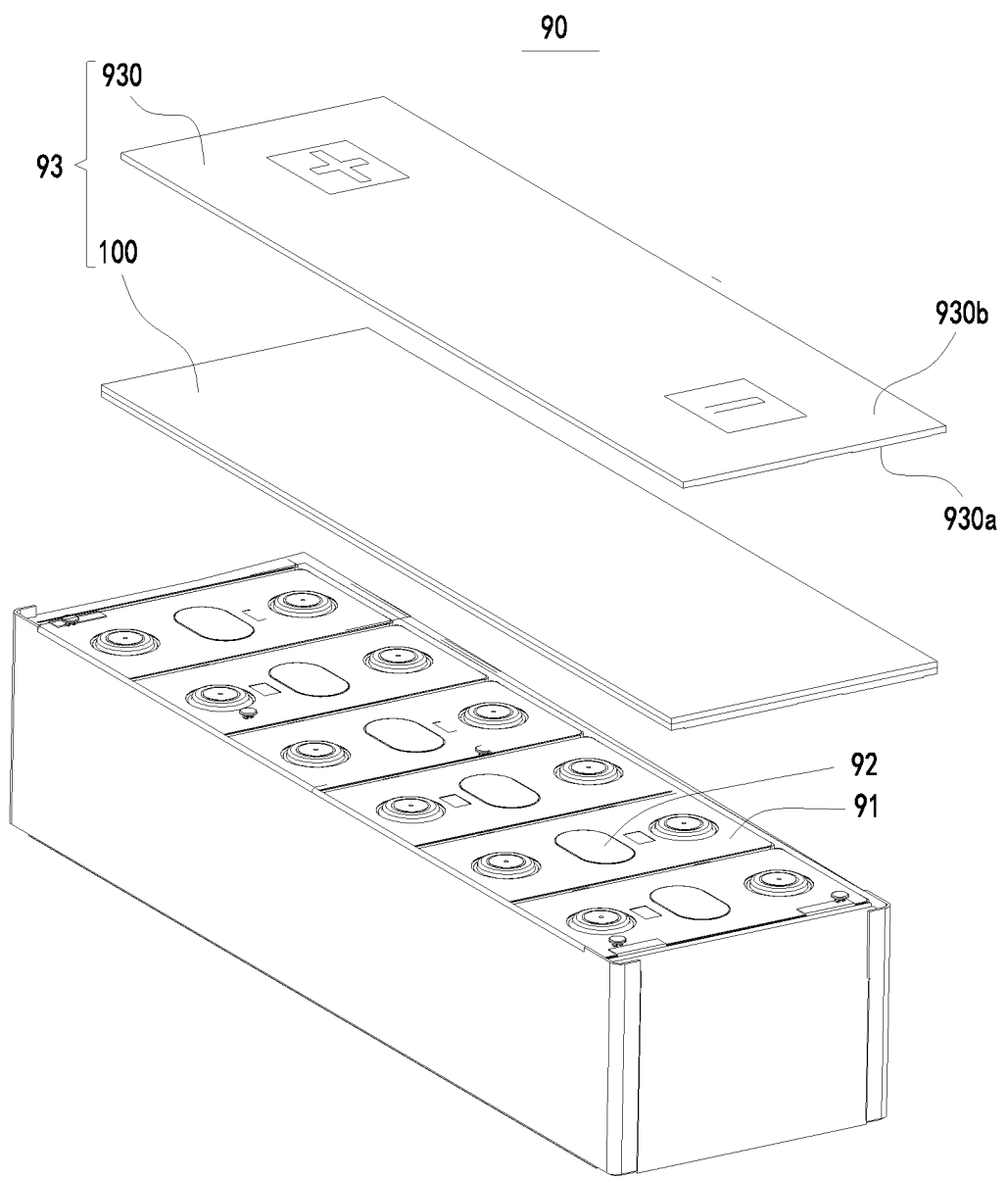
FIG. 15 is a schematic diagram of an exploded structure of a battery module according to an embodiment of the disclosure.
Figure 16:
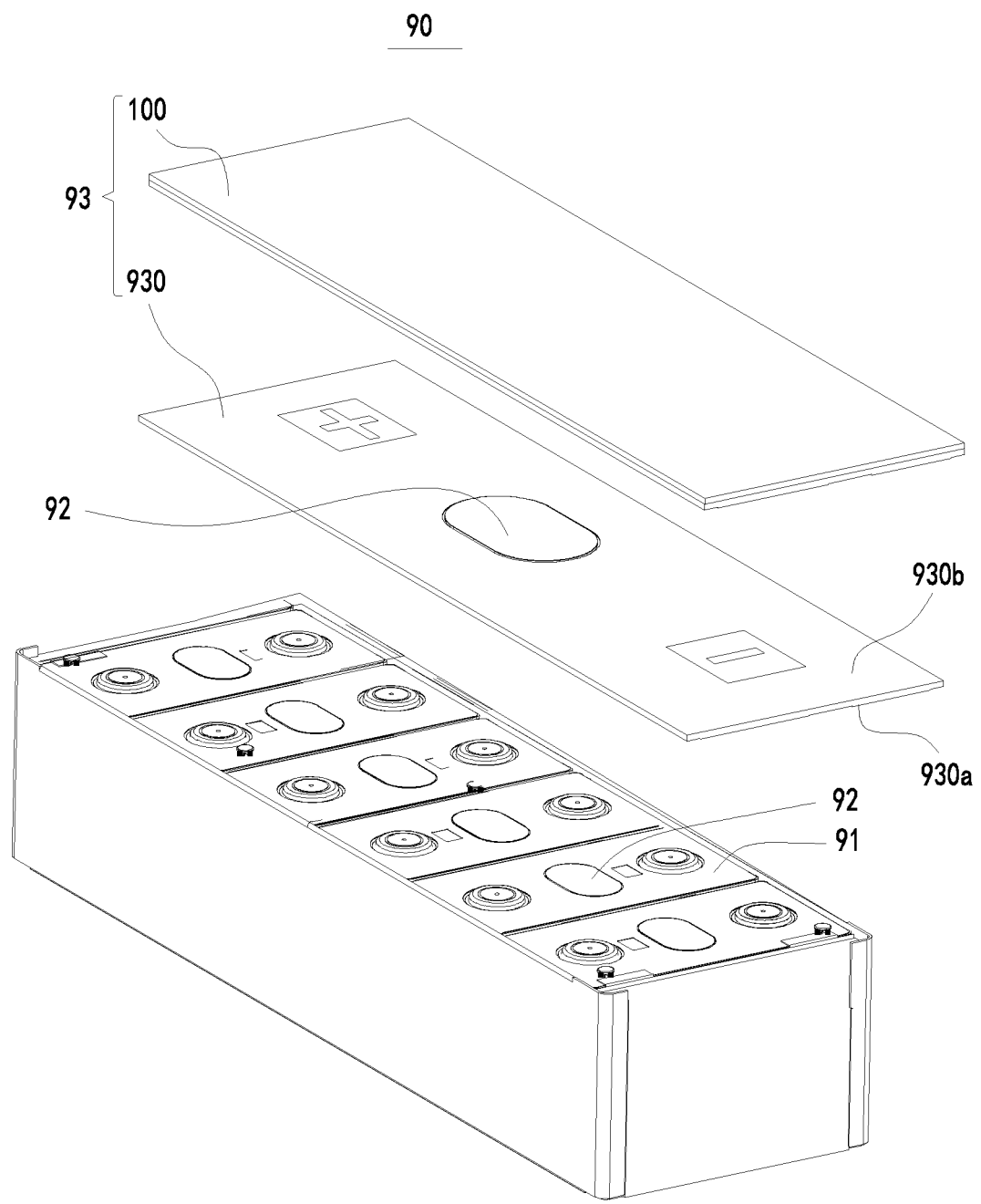
FIG. 16 is a schematic diagram of an exploded structure of a battery module according to another embodiment of the disclosure.

Referring to FIGS. 15 and 16, the disclosure further provides a cover 93 of the battery module 90. The cover 93 according to the embodiment comprises a cover body 930 and a protection assembly 100. The protection assembly and the cover body are stacked. The battery module 90 according to the embodiment comprises a case, a plurality of secondary batteries 91 that comprise pressure relief elements 92 and are disposed in the case, and a cover 93 according to the embodiment. The secondary battery 91 according to the embodiment comprises a pressure relief element 92. The cover 93 according to the embodiment can be connected to the case, and the pressure relief element 92 of the secondary battery 91 faces the cover 93.

In an embodiment, as shown in FIG. 15, the cover body 930 according to the embodiment comprises a first surface 930a and a second surface 930b opposing to the first surface 930a. When the cover 93 according to the embodiment is applied into the battery module 90, the first surface 930a of the cover body 930 faces the secondary battery 91 while the second surface 930b faces away from the secondary battery 91. The protection assembly 100 and the cover body 930 are stacked, and the protection assembly 100 is disposed at a side of the first surface 930a. A separate protective layer 120 of the protection assembly 100 is connected to the cover body 930. The protection assembly 100 can be disposed close to the secondary battery 91 and cover the pressure relief element 92. The protection assembly 100 according to the embodiment can be pressed against the secondary battery 91 and cover the pressure relief element 92. As such, when the secondary battery 91 operates abnormally such that the pressure relief element 92 bursts, the high temperature particles ejected from the pressure relief element 92 will be intercepted and blocked by the protection assembly 100. Also, the separate protective layer 120 can effectively prevent heat of the high temperature particles from being transferred to the cover 93, and the high temperature particles will not directly contact with and thereby burn the cover 93. Furthermore, heat of the intercepted high temperature particles will not be transferred to the cover 93 and thereby melt the cover 93 due to extremely high temperature.

The embodiment provides a way by which the cover 93 of the protection assembly 100 is disposed in the battery module 90, and the protection assembly 100 can be protected by the cover 93 and thus will not be scratched by or collided with other structural members. Accordingly, an overall structural integrity of the protection assembly 100 is ensured, and thereby the protective capability of the protection assembly 100 will not be impaired.

In an embodiment, the protection assembly 100 further comprises an insulation layer 130. The insulation layer 130 is connected to the particle-blocking layer 110. After the protection assembly 100 is mounted, the insulation layer 130 can separate a busbar of the secondary battery 91 from the particle-blocking layer 110. When the particle-blocking layer 110 is made of an electrically conductive material, the insulation layer 130 can reduce the possibility that short circuits occur between respective secondary batteries 91.

In another embodiment, as shown in FIG. 16, the protection assembly 100 is disposed at a side of the second surface 930b of the cover body 930. The particle-blocking layer 110 of the protection assembly 100 is connected to the cover body 930, and the particle-blocking unit faces the second surface 930b of the cover body 930. The protection assembly 100 covers the pressure relief elements 92 on the secondary battery 91 and on the cover body 930. Optionally, the pressure relief element 92 on the cover body 930 can be an explosion-proof valve, one-way valve or two-way valve. As such, when the secondary battery 91 operates abnormally such that the pressure relief element 92 bursts, the high temperature particles ejected from the pressure relief element 92 will first melt the cover 93, and subsequent high temperature particles will be intercepted and blocked by the particle-blocking layer 110. Also, the separate protective layer 120 can effectively prevent heat of the high temperature particles from being transferred to other structural members, thus the high temperature particles will not burn or melt the other structural members disposed adjacent to the cover 93. Furthermore, heat of the intercepted high temperature particles will not be transferred to the other structural members disposed adjacent to the cover 93. When the battery module is applied into the battery pack, the other structural member refers to the housing for accommodating the battery module. In one embodiment, the protection assembly 100 and the cover body 930 are connected to each other via bonding.

When the cover 93 according to the embodiment is applied into the battery module 90, it can effectively intercept the high temperature particles ejected from the pressure relief element 92 of the secondary battery 91, reduce the possibility that the high temperature particles are scattered from an interior of the battery module 90 to outside of the battery module 90 and thereby melt through the structural members adjacent to the battery module 90, and effectively improve operational safety of the battery module 90.

Figure 17:
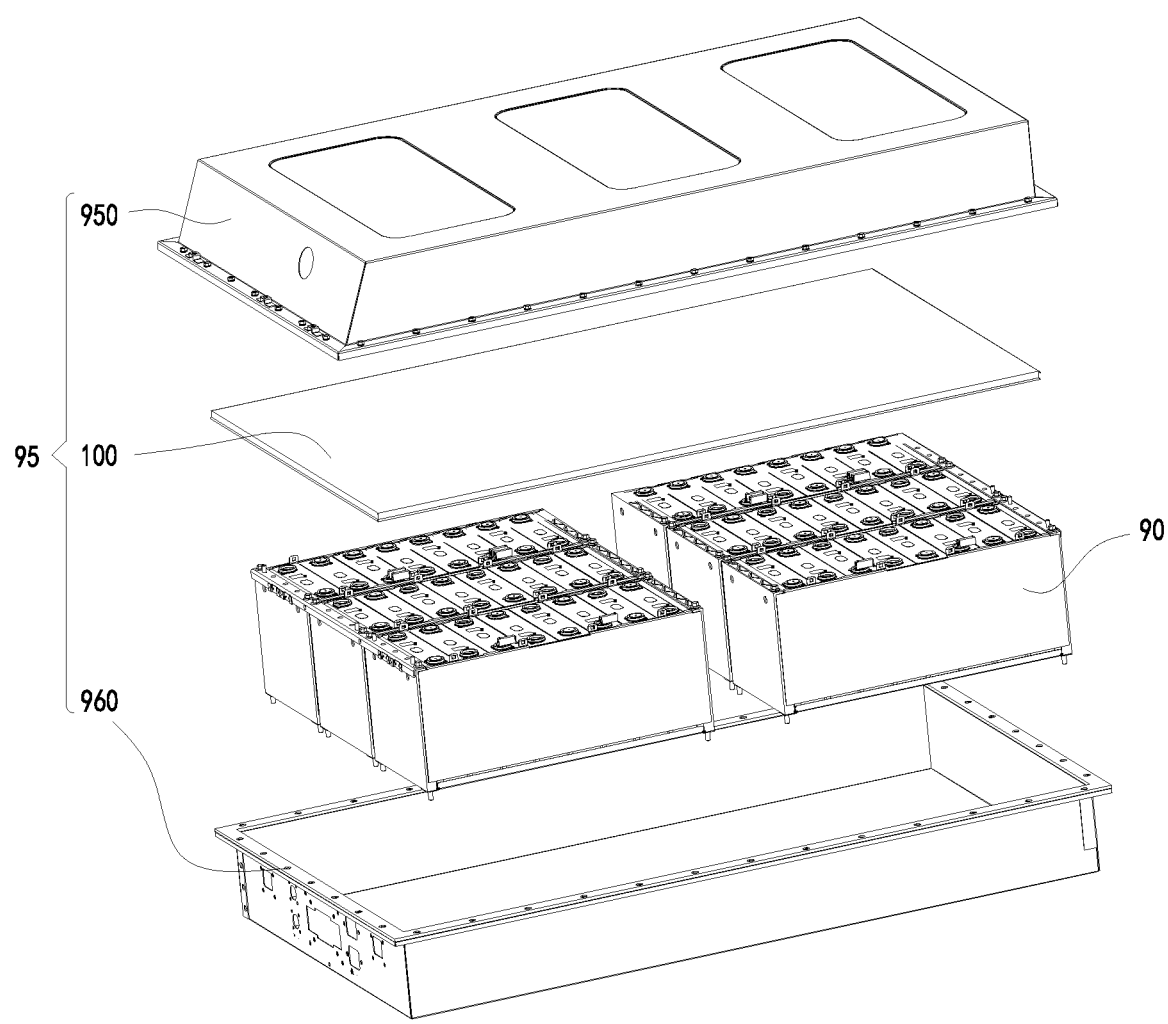
FIG. 17 is a schematic diagram of an exploded structure of a battery pack according to another embodiment of the disclosure.

As shown in FIG. 17, embodiments of the disclosure further provide a housing 95 for a battery pack 94. The housing 95 according to the embodiment comprises a first housing member 950, a second housing member 960 connected to the first housing member 950, and a protection assembly 100 disposed on the first housing member 950 and/or the second housing member 960.

The first housing member 950 and the second housing member 960 are connected in a sealed manner to form an accommodation space for receiving the battery module 90. The protection assembly 100 is disposed on a surface of the first housing member 950 and/or the second housing member 960 facing the accommodation space. The battery pack 94 according to the embodiment comprises a plurality of battery modules 90 arranged side by side and the housing 95 disposed corresponding to the cover 93 of the battery modules 90. The housing 95 according to the embodiment can cover the cover 93 of the battery module 90 to protect the battery module 90. In an embodiment, the battery module 90 according to the embodiment comprises a secondary battery 91 having a pressure relief element 92. Optionally, the pressure relief element 92 is an explosion-proof valve. The pressure relief element 92 of the secondary battery 91 is disposed corresponding to the cover 93. In another embodiment, a pressure relief element 92 is provided on the cover 93 of the battery module 90. The pressure relief element 92 on the cover 93 is disposed corresponding to the housing 95.

In an embodiment, as shown in FIG. 17, the first housing member 950 according to the embodiment comprises an accommodating concave portion. When the housing 95 and the battery module 90 are assembled, a portion of the battery module 90 is disposed in the accommodating concave portion of the first housing member 950. The protection assembly 100 according to the embodiment is disposed on a surface of the first housing member 950 facing the battery module 90. When the housing 95 according to the embodiment is applied into the battery pack, the protection assembly 100 according to the embodiment is disposed corresponding to the pressure relief element 92. Accordingly, when the battery pack 94 operates abnormally such that the pressure relief element 92 bursts, the protection assembly 100 can effectively intercept and block the high temperature particles and the high temperature gas ejected from the pressure relief element 92, prevent the high temperature particles and the high temperature gas from melting through the first housing member 950, and effectively improve the operational safety of the battery pack 94. In an embodiment, the separate protective layer 120 of the protection assembly 100 and the first housing member 950 of the housing 95 are connected to each other via bonding.

In an embodiment, the second housing member 960 according to the embodiment comprises an accommodating concave portion. The protection assembly 100 according to the embodiment is disposed on a surface of the second housing member 960 facing the battery module 90. When the housing 95 according to the embodiment is applied into the battery pack, the protection assembly 100 can effectively intercept and block the high temperature particles and the high temperature gas ejected from the pressure relief element 92, prevent the high temperature particles and the high temperature gas from melting through the second housing member 960, and effectively improve the operational safety of the battery pack 94. In an embodiment, the separate protective layer 120 of the protection assembly 100 and the second housing member 960 of the housing 95 are connected to each other via bonding.

In an embodiment, the protection assemblies 100 are disposed on both the first housing member 950 and the second housing member 960. When the housing 95 according to the embodiment is applied into the battery pack, the protection assembly 100 can effectively intercept and block the high temperature particles and the high temperature gas ejected from the pressure relief element 92, prevent the high temperature particles and the high temperature gas from melting through the first housing member 950 and the second housing member 960, and effectively improve the operational safety of the battery pack 94.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A battery module, comprising a case, a plurality of secondary batteries that comprise pressure relief elements and are disposed in the case, and a cover configured to connect to the case, wherein the pressure relief element is structured to deform in response to an increasing internal pressure in the secondary battery until the pressure relief element bursts, and the secondary battery can expel high temperature particles through the burst pressure relief element, wherein
the cover comprises a cover body and a protection assembly, wherein the protection assembly and the cover body are stacked; and
the protection assembly comprises:
a particle-blocking layer comprising a receiving side for receiving the high temperature particles and a connecting side opposite to the receiving side, wherein the particle-blocking layer comprises a plurality of particle-blocking units in a concave-convex arrangement, and the particle-blocking unit can block the high temperature particles; and
a separate protective layer disposed at the connecting side of the particle-blocking layer and connected to the particle-blocking layer,
wherein the particle-blocking layer comprises a sheet body and a plurality of protrusions protruding from a surface of the body in its thickness direction and spaced apart from each other, each particle-blocking unit comprises two adjacent protrusions and a concave between the two adjacent protrusions, the separate protective layer is disposed on a surface of the body away from the protrusions, and the two adjacent protrusions in the particle-blocking layer satisfy a relation (1), $$0.005 \leq d/(D-d) \leq 5 \qquad (1)$$

wherein the two adjacent protrusions each has a projection on the surface of the body, and a straight connecting line between respective central points of the two adjacent protrusions in the projections is denoted as H, and wherein in the relation (1), d refers to a dimension from a central point of one of the two adjacent protrusions in the projection to its own edge in the projection along the straight connecting line, and D refers to a dimension from a central point of one of the two adjacent protrusions in the projection to an edge of the other protrusion in the projection along the straight connecting line.

2. The battery module according to claim 1, wherein the particle-blocking layer is configured to have a structure in which the high temperature particles can be accumulated on the particle-blocking units by accumulation.

3. The battery module according to claim 1, wherein the particle-blocking layer and the separate protective layer are stacked.

4. The battery module according to claim 1, wherein the particle-blocking layer has a resistance to melting of 500° C. to 3000° C.

5. The battery module according to claim 2, wherein the particle-blocking layer has a resistance to melting of 500° C. to 3000° C.

6. The battery module according to claim 3, wherein the particle-blocking layer has a resistance to melting of 500° C. to 3000° C.

7. The battery module according to claim 1, wherein a resistance to melting of the particle-blocking layer is inversely proportional to its tolerance time, the temperature tolerance of the particle-blocking layer is ranged from 500° C. to 2000° C., and accordingly the tolerance time for melting of the particle-blocking layer is from 2 s to 3600 s.

8. The battery module according to claim 2, wherein a resistance to melting of the particle-blocking layer is inversely proportional to its tolerance time, the temperature tolerance of the particle-blocking layer is ranged from 500° C. to 2000° C., and accordingly the tolerance time for melting of the particle-blocking layer is from 2 s to 3600 s.

9. The battery module according to claim 3, wherein a resistance to melting of the particle-blocking layer is inversely proportional to its tolerance time, the temperature tolerance of the particle-blocking layer is ranged from 500° C. to 2000° C., and accordingly the tolerance time for melting of the particle-blocking layer is from 2 s to 3600 s.

10. The battery module according to claim 1, wherein the particle-blocking layer is made of iron and its alloys, copper and its alloys, nickel alloys, carbon fiber or aramid; and/or the separate protective layer is made of organic foam, aerogel composite material, fireproof fabrics or fireproof coatings.

11. The battery module according to claim 2, wherein the particle-blocking layer is made of iron and its alloys, copper and its alloys, nickel alloys, carbon fiber or aramid; and/or the separate protective layer is made of organic foam, aerogel composite material, fireproof fabrics or fireproof coatings.

12. The battery module according to claim 3, wherein the particle-blocking layer is made of iron and its alloys, copper and its alloys, nickel alloys, carbon fiber or aramid; and/or the separate protective layer is made of organic foam, aerogel composite material, fireproof fabrics or fireproof coatings.

13. The battery module according to claim 1, wherein the separate protective layer has a thickness of 0.5 mm to 10 mm.

14. The battery module according to claim 2, wherein the separate protective layer has a thickness of 0.5 mm to 10 mm.

15. The battery module according to claim 3, wherein the separate protective layer has a thickness of 0.5 mm to 10 mm.

16. The battery module according to claim 1, wherein the protection assembly further comprises an insulation layer connected to the particle-blocking layer, wherein the insulation layer and the separate protective layer are disposed at two respective sides of the particle-blocking layer, and the insulation layer covers the particle-blocking units.

17. The battery module according to claim 2, wherein the protection assembly further comprises an insulation layer connected to the particle-blocking layer, wherein the insulation layer and the separate protective layer are disposed at two respective sides of the particle-blocking layer, and the insulation layer covers the particle-blocking units.

18. The battery module according to claim 3, wherein the protection assembly further comprises an insulation layer connected to the particle-blocking layer, wherein the insulation layer and the separate protective layer are disposed at two respective sides of the particle-blocking layer, and the insulation layer covers the particle-blocking units.

19. A battery pack, wherein the battery pack comprises a plurality of battery modules according to claim 1, wherein the battery pack is provided with a housing comprising:
  a first housing member; and
  a second housing member connected to the first housing member in a sealed manner, wherein the first housing member and the second housing member form an accommodation space for receiving the battery modules;
  wherein the protection assembly is disposed on a surface of the first housing member and/or the second housing member facing the battery modules.

20. The battery pack according to claim 19, wherein the particle-blocking layer is configured to have a structure in which the high temperature particles can be accumulated on the particle-blocking units by accumulation.

* * * * *